(12) United States Patent
Nicholas et al.

(10) Patent No.: US 10,939,737 B2
(45) Date of Patent: Mar. 9, 2021

(54) HAIR-RETAINING DEVICE AND METHOD OF MANUFACTURE

(71) Applicant: Pretty Knotty, LLC, Newport, RI (US)

(72) Inventors: Shelly Nicholas, Newport, RI (US); Jacob Eberhart, Rockville, MD (US)

(73) Assignee: Pretty Knotty, LLC, Newport, RI (US)

( * ) Notice: Subject to any disclaimer, the term of this patent is extended or adjusted under 35 U.S.C. 154(b) by 279 days.

(21) Appl. No.: 15/882,922

(22) Filed: Jan. 29, 2018

(65) Prior Publication Data
US 2018/0213911 A1    Aug. 2, 2018

Related U.S. Application Data

(60) Provisional application No. 62/452,649, filed on Jan. 31, 2017.

(51) Int. Cl.
| | |
|---|---|
| *A45D 8/20* | (2006.01) |
| *B32B 1/02* | (2006.01) |
| *A45D 8/36* | (2006.01) |
| *B29C 48/00* | (2019.01) |
| *A45D 8/28* | (2006.01) |
| *A45D 8/24* | (2006.01) |
| *A45D 8/32* | (2006.01) |
| *A45D 8/26* | (2006.01) |

(Continued)

(52) U.S. Cl.
CPC .................. *A45D 8/20* (2013.01); *A45D 8/24* (2013.01); *A45D 8/26* (2013.01); *A45D 8/28* (2013.01); *A45D 8/30* (2013.01); *A45D 8/32* (2013.01); *A45D 8/36* (2013.01); *B29C 48/001* (2019.02); *B32B 1/02* (2013.01); *B05D 3/002* (2013.01); *B05D 3/12* (2013.01); *B05D 5/083* (2013.01); *B05D 7/02* (2013.01); *B29C 48/002* (2019.02); *B29C 48/0022* (2019.02); *B29C 48/09* (2019.02); *B29C 48/286* (2019.02); *B29C 2793/009* (2013.01); *B29C 2793/0027* (2013.01); *B29K 2027/12* (2013.01); *B29K 2083/00* (2013.01); *B29L 2009/005* (2013.01); *B29L 2031/718* (2013.01)

(58) Field of Classification Search
CPC .... B32B 1/02; A45D 8/20; A45D 8/22; A45D 8/24; A45D 8/26; A45D 8/28; A45D 8/30; A45D 8/32; A45D 8/34
See application file for complete search history.

(56) References Cited

U.S. PATENT DOCUMENTS

| RE24,478 E | 5/1958 | Kilbourne |
|---|---|---|
| 4,836,226 A | 6/1989 | Wolak |

(Continued)

*Primary Examiner* — Walter Aughenbaugh
(74) *Attorney, Agent, or Firm* — New York Law School PPC

(57) ABSTRACT

A hair-retaining device is described as having a base material, a layer of epoxy resin, a compliant exterior layer disposed over the base material and joined to the base material of epoxy resin, and a top coat layer disposed over the compliant exterior layer. The method of making a hair-retaining device is described. The method involves extruding a base material to a predetermined shape, cutting the predetermined shape of the base material to a predetermined thickness, abrading a surface of the base material, applying an epoxy resin to the base material, and applying a compliant exterior layer disposed over the base material and joined to the base material by the epoxy resin.

20 Claims, 3 Drawing Sheets

(51) Int. Cl.
*A45D 8/30* (2006.01)
*B05D 5/08* (2006.01)
*B29K 83/00* (2006.01)
*B29L 9/00* (2006.01)
*B29L 31/00* (2006.01)
*B29C 48/09* (2019.01)
*B05D 3/12* (2006.01)
*B29K 27/12* (2006.01)
*B29C 48/285* (2019.01)
*B05D 7/02* (2006.01)
*B05D 3/00* (2006.01)

(56) References Cited

U.S. PATENT DOCUMENTS

| | | | |
|---|---|---|---|
| 6,257,251 B1* | 7/2001 | Burleson | A45D 8/24 |
| | | | 132/279 |
| 9,072,354 B1 | 7/2015 | Tucker | |
| 2006/0157077 A1 | 7/2006 | Kraft et al. | |
| 2016/0289441 A1 | 10/2016 | Hsu | |

\* cited by examiner

HAIR-RETAINING DEVICE AND METHOD OF MANUFACTURE

PRIORITY INFORMATION/INCORPORATION BY REFERENCE

This application claims priority to U.S. Provisional Application 62/452,649 entitled "Hair-Retaining Device and Method of Manufacture," filed on Jan. 31, 2017, the entirety of which is incorporated herein by reference.

BACKGROUND INFORMATION

In the past, a user would use a rubber band as a one-piece hair tie to wrap around a users' ponytail. The rubber band would hold hair; however, the structural integrity of the rubber band would mean that eventually and oftentimes sooner rather than later, the band would snap and another rubber band would be needed. In addition, the tackiness of the rubber band pulls at the hair and oftentimes creates friction upon being placed on and taken off of the hair. This friction combined with the tackiness inherent in the rubber band pulls out hair, meaning that the solution of tied-back hair in a rubber band can be more painful than the problem of loose hair.

To address the tackiness issue of rubber bands as hair ties, products such as the Scrunchie®, and its various competitors combined the flexibility of rubber bands inside of a sheath of low-friction cloth. The cloth addressed the hair-pulling problems of rubber bands, however the poor longevity of rubber bands still persisted. In addition, the cloth sheath, while protecting the user's hair from being pulled, also presented a problem for athletes because it would absorb sweat and moisture and become a petri dish for bacteria and thus becomes odorous. Additionally, the cloth frills contained in the Scrunchie® give it a high-profile design which is not advantageous for athletes to use as it adds bulk to their hair and does not appear sporty.

Some competitors designed a lower-profile hair tie to address the bulk and high profile of the Scrunchie®. This lower-profile hair tie contained a much tighter nylon sheath and visible and tactile electronic weld for the elastic element. With less room for elastic elements, these hair ties did not have as much structural integrity and did not last as long. However, these hair ties were inexpensive to make and thus inexpensive to buy in bulk by consumers. Consumers began to view hair ties as a low-cost commodity to contain their hair and something to be used and discarded quickly.

Consumers did not complain about these low-profile hair ties because of their image as an inexpensive commodity to be bought in bulk. However, some companies capitalized on consumer's issues with these hair ties being unable to grip slick, wet or oily hair types well or last long in athletic environments and added exposed rubber elements to their hair tie sheaths. As before with rubber bands, these exposed rubber elements held hair but also pulled on it, pulling much more so than rubber bands by themselves, because of the stronger elastic bands inside.

SUMMARY

In accordance with the various exemplary embodiments, a hair-retaining device is described. The hair-retaining device has a base material, a layer of epoxy resin, a compliant exterior layer disposed over the base material and joined to the base material of epoxy resin, and a top coat layer disposed over the compliant exterior layer.

In addition, according to the various exemplary embodiments, a method of making a hair-retaining device is described. The method of making a hair retaining device involves extruding a base material to a predetermined shape, cutting the predetermined shape of the base material to a predetermined thickness, abrading a surface of the base material, applying an epoxy resin to the base material, and applying a compliant exterior layer disposed over the base material and joined to the base material by the epoxy resin.

DETAILED DESCRIPTION

Figure 1:
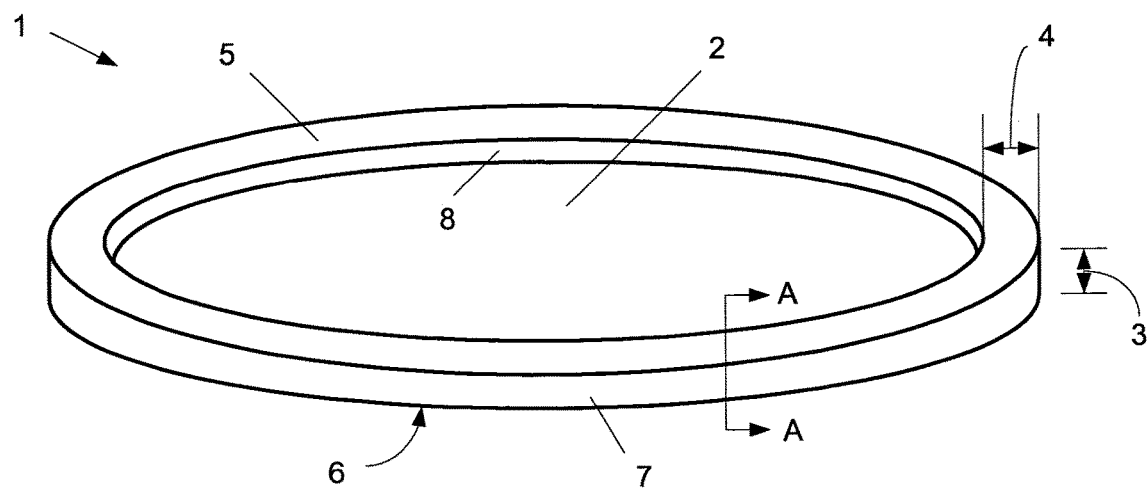
FIG. 1 schematically illustrates an exemplary hair-retaining device according to various embodiments described herein.

The exemplary embodiments may be further understood with reference to the following description and the appended drawings, wherein like elements are referred to with the same reference numerals. The exemplary embodiments describe a hair-retaining device and method of making the hair-retaining device. The exemplary embodiments provide a hair-retaining device that includes a silicone ring as an alternative to non-grippy and grime-absorbing fabric sheaths. The silicone is used because it has features of being chemically inert and a desired level of tackiness and recoil. However, the exemplary embodiments also include additional layers of glossy material added to the silicone base to adjust the level of grip exerted by the hair-retaining device. The exemplary hair-retaining device is long lasting, does not pull hair, is not bulky (e.g., it has a low profile) and it is not a magnet for sweat, water or other moisture, thereby preventing the hair-retaining device from becoming odorous.

As will be described in greater detail below, silicone tubing is extruded through a die and thus only the interior cavity and exterior edge are exposed during manufacturing, allowing the interior of the tubing to retain structural integrity and thus last longer. This extruded silicone tubing is cut into sections using a lathe cutter, in the same fashion in which o-rings are cut. As the pieces of silicone are cut after manufacturing instead of before, they have not been exposed to air during the manufacturing process and have a higher degree of strength than molded silicone rings. As extruding and then lathe cutting is a much quicker and less laborious process than making individual silicone molds, the exemplary hair-retaining device is produced much more quickly than its aforementioned competitors in the market.

FIG. 1 schematically illustrates an exemplary hair-retaining device 1. The exemplary hair-retaining device 1 has a generally elliptical shape. However, this shape is only exemplary and the hair-retaining device 1 may take the form of other shapes, e.g., circular, square, rectangular, star shaped, etc. The generally elliptical shape includes a hollow center 2 such that the hair-retaining device 1 may be placed over the user's hair, e.g., the user may insert their hair into the hollow center 2. The hair-retaining device 1 has a first width or thickness 3 in the axial direction (axial width) and a second width or thickness in the radial direction 4 (radial width) as shown in FIG. 1. Typically, the radial width 4 exceeds the axial width 3. In one exemplary embodiment, the axial width is 1 mm, but any axial width 3 may be used.

In this exemplary embodiment, the hair-retaining device 1 has four (4) exterior surfaces, a top surface 5, a bottom surface 6, an outside surface 7 and an inside surface 8. In this description, these surfaces may be referred to specifically by the nomenclature above or, in general, as an exterior surface. The top surface 5 and the bottom surface 6 have the width of the radial width 4, while the outside surface 7 and an inside surface 8 have the width of the axial width 3. It is noted that the hair-retaining device 1 having four exterior surfaces is only exemplary.

The result of the radial width 4 exceeding the axial width 3 is that when the hair-retaining device 1 is placed on a flat surface, the hair-retaining device 1 will appear to lay flat. Specifically, when the hair-retaining device 1 is placed on a flat surface, the top surface 5 or the bottom surface 6 (depending on the orientation of the hair-retaining device 1) will be the exterior surface that will contact the flat surface. The thinner outside surface 7 and inside surface 8 will not contact the flat surface. While the hair-retaining device 1 is neither a washer or a rubber band, a comparison of these objects may provide context for the shape of the hair-retaining device 1. When a washer is laid on a flat surface, typically the surface having the larger thickness will contact the flat surface. This is similar to the hair-retaining device 1. In contrast, when a rubber band is laid on a flat surface, typically the surface having the smaller thickness will contact the flat surface. This is different from the hair-retaining device 1.

Figure 2:
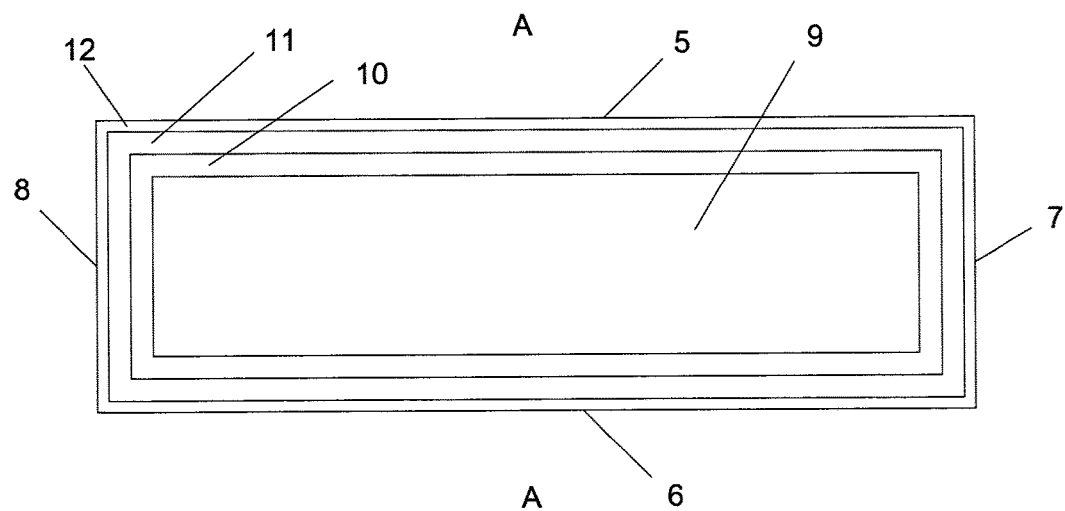
FIG. 2 schematically illustrates a cross section of the exemplary hair-retaining device shown in FIG. 1 according to various embodiments described herein.

FIG. 2 schematically illustrates a cross-section A-A of the exemplary hair-retaining device 1 of FIG. 1. The cross-section shows the four exterior surfaces of the hair-retaining device 1, the top surface 5, the bottom surface 6, the outside surface 7 and the inside surface 8. The cross-section also shows that the hair-retaining device 1 may include a base material 9, one or more compliant exterior layers 10 and 11 and a top coat layer 12. In one example, the base material 9 is comprised of silicone.

The compliant exterior layers 10 and 11 may comprise any suitable material, such as a polymer, a fluoropolymer, a silicone, a fluorosilicone, a fluoroelastomer or a combination thereof. In one exemplary embodiment, the compliant exterior layers 10 and 11 may comprise a PTFE or Parlene-C. The compliant exterior layers 10 and 11 may have a range of thicknesses that may be determined, based on, for example, a percent by weight of the total solid weight of the hair-retaining device 1. The one or more compliant exterior layers 10 and 11 may reduce the friction for the wearer. In this exemplary embodiment, there are two (2) compliant exterior layers. However, this is only exemplary and there may be any number of layers of PTFE and/or Parylene-C. In addition to the total thickness of compliant exterior layers 10 and 11 varying as described above, the thickness of each individual compliant exterior layer 10 and 11 may vary. In this example, the two layers of PTFE and/or Parylene-C are shown as having the same thicknesses, but this is only exemplary and the different layers may also have different thicknesses.

The hair-retaining device 1 may also include a top coat layer 12 including a glassy surface disposed over the one or more compliant exterior layers 10 and 11. The top coat layer 5 may have a range of thicknesses and may also be based on a percent by weight of the total solid weight of hair-retaining device 1. It should be noted that the top coat layer 12 may be the PTFE and/or Parylene-C of compliant exterior layer 11. That is, as multiple layers of PTFE and/or Parylene-C are added, the top layer of the PTFE and/or Parylene-C may appear to have a glassy surface similar to multiple layers of paint on a car. In another example, the top coat layer 12 may be a different material.

Figure 3:
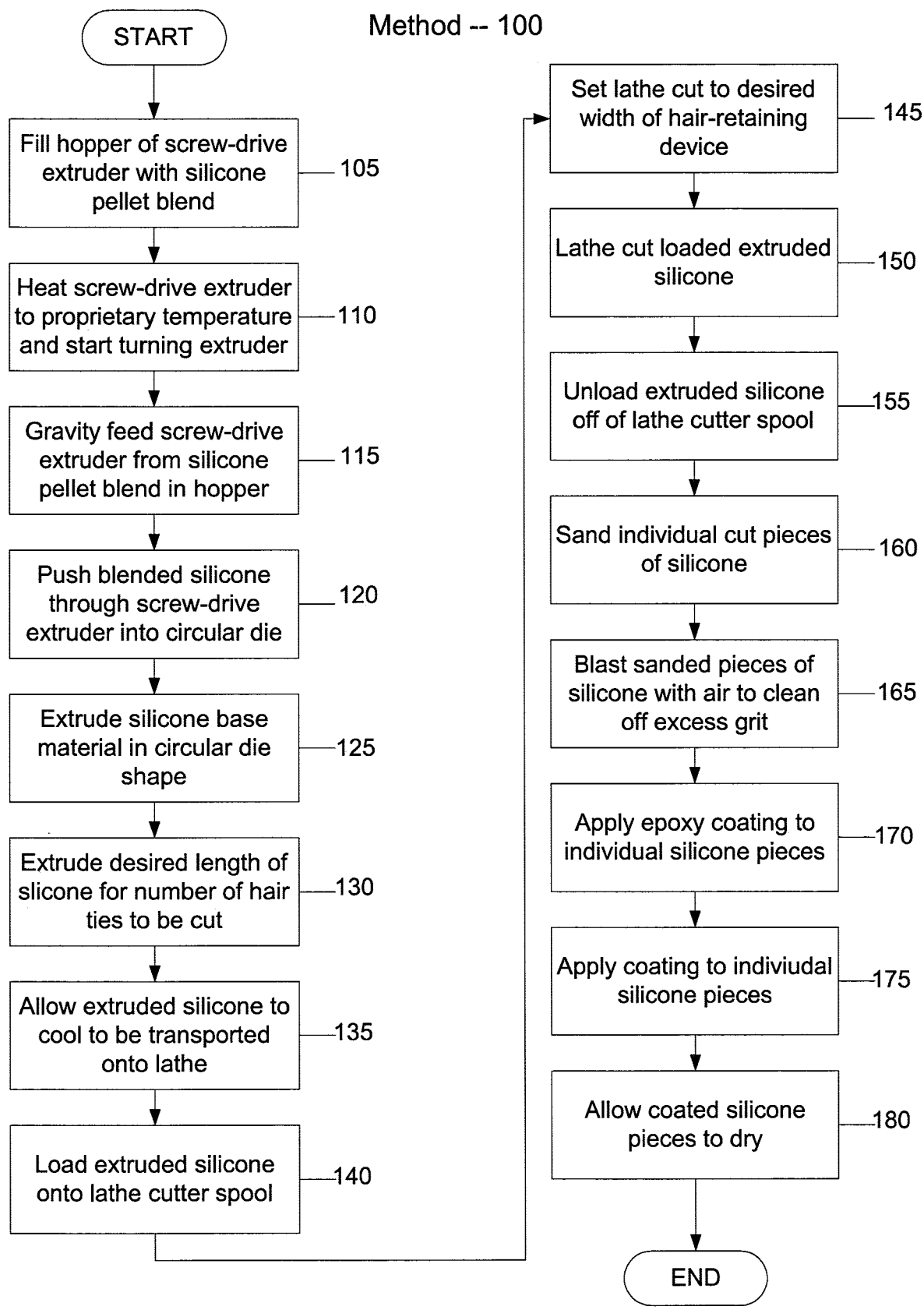
FIG. 3 shows an exemplary method of making a hair-retaining device according to various embodiments described herein.

FIG. 3 shows an exemplary method 100 of making the hair-retaining device 1. The method 100 will be described with reference to the hair-retaining device 1 as shown in FIGS. 1 and 2 and with reference to the extruded silicone shape shown in FIG. 4 and as will be described in greater detail below. In step 105, silicone pellets are loaded into a hopper for a screw-type extruder. As described above, the base material 9 of the hair-retaining device 1 may comprise of silicone having a range of 0.1 to 15.0 percent by weight of a total solid weight of the hair-retaining device and a thickness in a range of 10 picometers to 10 millimeters. The blend of silicone pellets may vary in each mix depending on the color and attributes needed for each batch. Once the screw-type extruder is warmed up in step 110 to a proprietary temperature determined by the extruder and blender, then the hopper gravity-feeds the pellets into the extruder in step 115. The speed that the hopper feeds the pellets will depend on the size of the pellets, the type of screw mixer and other secondary manufacturing factors.

Figure 4:
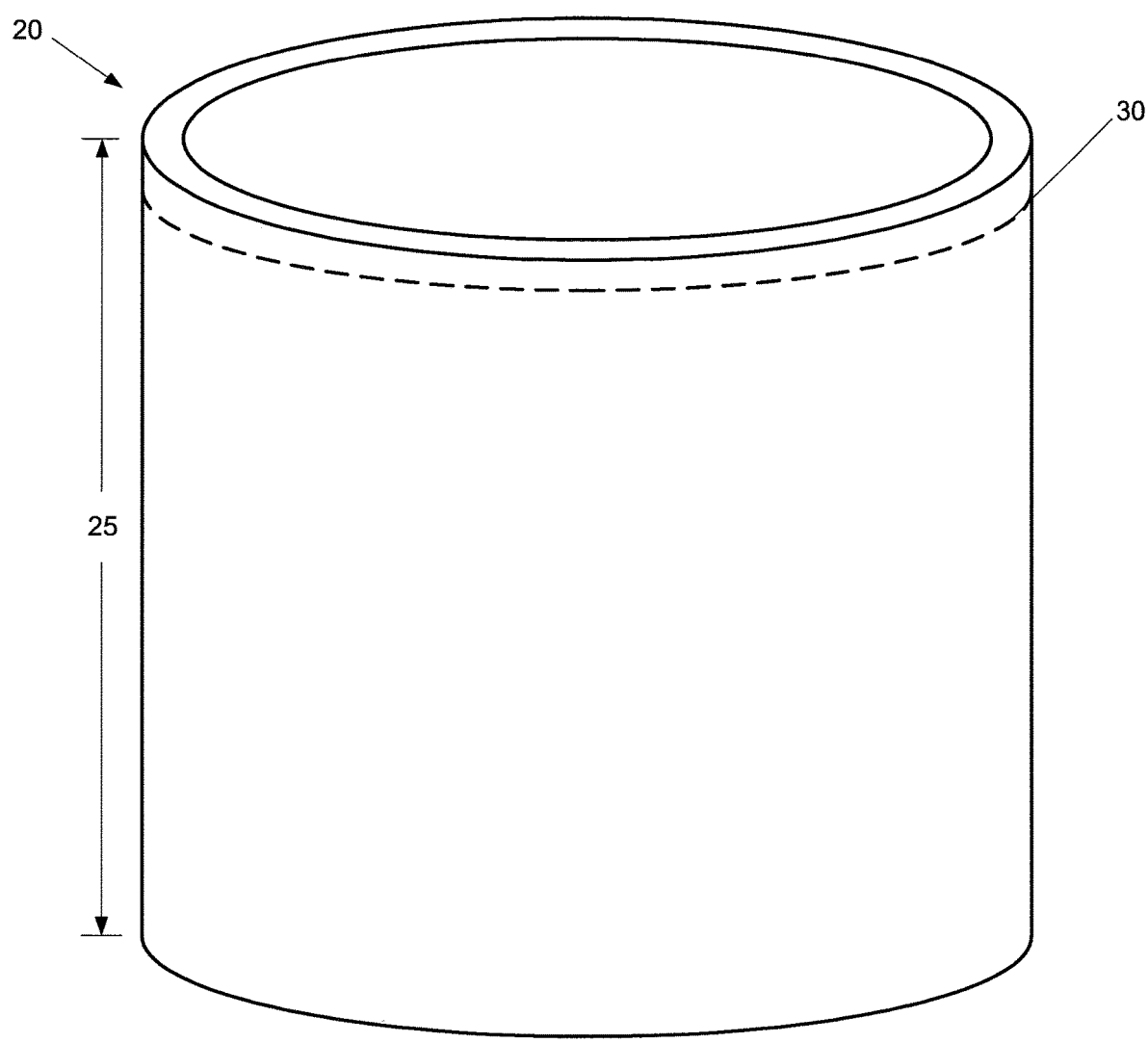
FIG. 4 shows an exemplary extruded silicone shape to be used as a base material for the exemplary hair-retaining device according to various embodiments described herein.

In step 120, the gravity-fed pellets are blended through the heated screw-type mixer and pushed through a circular die. Again, as described above, the hair-retaining device 1 may comprise a variety of shapes and dies corresponding to these different shapes may be used in the method 100. In step 125, the silicone that will be used to create the base material 9 is extruded into the shape of the die. The result of step 125 may be the exemplary extruded silicone shape 20 as shown in FIG. 4. As can be seen, the extruded silicone shape 20 is the general shape of the hair-retaining device 1, but is elongated in the direction 25 in the shape of a cylinder.

Once step 125 is in process, the extrusion will be produced in the desired length in step 130. For example, the length 25 of the extruded silicone shape 20 may depend on how many hair-retaining devices 1 are to be made in this batch and may also depend on the thickness of each of the hair-retaining devices 1. To provide a specific example, a silicone shape 20 having a length 25 of 10 mm may be used to produce five (5) 2 mm hair-retaining device 1. After the desired length is extruded for the desired thickness of each piece, the extruded silicone 20 cools in step 135, in order to be moved. Without proper cooling, the extruded silicone 20 will not be able to be lathe-cut smoothly and may be damaged. An infrared thermometer or another method of temperature gauging may be used to determine when the silicone has cooled to an appropriate temperature.

Once step 135 has concluded and the silicone extrusion 20 has cooled, then the cured silicone extrusion 20 may be placed on a lathe-cutter in step 140. This lathe cutter uses a spool of appropriate thickness to hold the extruded silicone 20 for cutting. After the silicone extrusion 20 is secured onto the lathe cutter and held tightly enough to puncture and separate the silicone material without vibration or movement, then the blades on the lathe cutter will be set to 2 mm or another desired thickness for the width of hair-retaining device 1 in step 145.

In step 150, the extruded silicon shape 20 is cut to the desired width. Referring to FIG. 4, the dashed line 30 shows the location of a first cut. As will be apparent to those skilled in the art, the cutting of the extruded silicon shape 20 along line 30 will result in a piece of silicone material that is substantially the shape of the hair-retaining device 1. In this example, the width of each cut section may be approximately 2 mm. However, other widths may also be used. It should be understood that this cutting width is substantially equivalent to the axial width 3 of the hair-retaining device 1. It is noted that the width may increase slightly as extra layers, e.g., layers 10, 11 and 12 may be added to the base material 9. The cut pieces of the hair-retaining device 1 remain on the lathe cutter after being sliced and must be removed from the lathe cutter in step 155. The cut pieces of hair-retaining device 1 should not be subject to skin oils or other substances which may impart unwanted materials onto the surface of the silicone, when they are removed from the lathe cutter.

In step 160, the exterior surfaces of the cut silicone base material 9 may be subjected to abrasion from sandpaper or other abrasive material or process (e.g., sand blasting). In one example, the abrasive material may have a grit in the range of 1500 to 3000 grit. The abrasion of the surface of the base material 9 may prepare the surface to receive the additional coatings of PTFE and/or Parylene-C as will be described in greater detail below. In step 165, the individual pieces of silicone that were abraded or sanded in step 160 may be cleaned to clear the surface of residue from sandpaper grit and/or silicone dust. For example, the cleaning process may be performed by subjecting the individual pieces of silicone to a jet of air.

In step 170, an epoxy may be applied to the surface of the base material 9. In one example, the epoxy layer may have a thickness in the range of 10 pm (picometers) to 10 mm (millimeters). In a specific example, the epoxy layer may include one or more functional layers added in an amount in a range of 0.1 to 15.0 percent by weight of the total solid weight of the hair-retaining device 1. The epoxy will be used in the next step to allow the PTFE and/or Parylene-C that will form the compliant exterior layers to be joined to the base material 9.

In step 175, the one or more compliant exterior layers of PTFE and/or Parylene-C are joined to the surface of the base material 9 to form the hair-retaining device 1. In one example, the PTFE and/or Parylene-C layers are added using a drum coating process, but any process may be used, such as a spray coating process, etc. The epoxy that was added in the last step 170 may be activated to create the bond that joins the compliant exterior layers to the base material 9. In one example, the one or more compliant exterior layers of PTFE and/or Parylene-C may have a thickness in a range from 10 pm to 10 mm. The one or more compliant exterior layers of PTFE and/or Parylene-C may be added in an amount in a range of 0.1 to 15.0 percent by weight of the total solid weight of the hair-retaining device 1.

It should be noted that depending on the number of compliant exterior layers, the steps 170 and 175 may be repeated multiple times to join the desired number of compliant exterior layers. In addition, the steps 170 and 175 may also be used to join the glass top coating 12 to the compliant exterior layers. The glass top coat 12 may have a range of 0.1 to 15.0 percent by weight of a total solid weight of the hair-retaining device and a thickness in a range of 10 picometers to 10 millimeters.

After a sufficient number of compliant exterior layers have been added, in step 180, the pieces of hair-retaining device 1 may be placed on a clean surface in a room free from free-floating particulates in order to dry sufficiently for use in the market. A fan or fans and/or jet or jets of air may be used to aid and to decrease the amount of time needed for drying these pieces of hair-retaining device 1.

It will be apparent to those skilled in the art that various modifications may be made in the present invention, without departing from the spirit or the scope of the invention. Thus, it is intended that the present invention cover modifications and variations of this invention provided they come within the scope of the appended claims and their equivalent.

What is claimed is:

1. A hair-retaining device, comprising:
   a base material;
   a layer of epoxy resin;
   a compliant exterior layer disposed over the base material and joined to the base material by the layer of epoxy resin; and
   a top coat layer disposed over the compliant exterior layer, wherein each of the layer of epoxy resin and the compliant exterior layer comprise a plurality of layers.

2. The hair-retaining device of claim 1, wherein each of the plurality of compliant exterior layers has the same thickness.

3. The hair-retaining device of claim 1, wherein the base material comprises silicone.

4. The hair-retaining device of claim 3, wherein the base material is comprised of silicone having a range of 0.1 to 15.0 percent by weight of a total solid weight of the hair-retaining device and a thickness in a range of 10 picometers to 10 millimeters.

5. The hair-retaining device of claim 1, wherein the hair-retaining device has a substantially circular or elliptical shape with a hollow center.

6. The hair-retaining device of claim 5, wherein an axial width of the hair-retaining device is smaller than a radial width of the hair-retaining device.

7. The hair-retaining device of claim 1, wherein the epoxy resin layer has a range of 0.1 to 15.0 percent by weight of a total solid weight of the hair-retaining device and a thickness in a range of 10 picometers to 10 millimeters.

8. The hair-retaining device of claim 1, wherein the compliant exterior layer has a range of 0.1 to 15.0 percent by weight of a total solid weight of the hair-retaining device and a thickness in a range of 10 picometers to 10 millimeters.

9. The hair-retaining device of claim 1, wherein the top coat layer has a range of 0.1 to 15.0 percent by weight of a total solid weight of the hair-retaining device and a thickness in a range of 10 picometers to 10 millimeters.

10. The hair-retaining device of claim 1, wherein the compliant exterior layer is comprised of one of a polymer, a fluoropolymer, a silicone, a fluorosilicone, a fluoroelastomer or a combination thereof.

11. The hair-retaining device of claim 1, wherein the top coat layer comprises one of a PTFE or Parylene-C.

12. A hair-retaining device, comprising:
    a base material;
    a layer of epoxy resin;
    a compliant exterior layer disposed over the base material and joined to the base material by the layer of epoxy resin; and
    a top coat layer disposed over the compliant exterior layer, wherein the top coat layer comprises one of a PTFE or Parylene-C.

13. The hair-retaining device of claim 12, wherein the hair-retaining device has a substantially circular or elliptical shape with a hollow center.

14. The hair-retaining device of claim 13, wherein an axial width of the hair-retaining device is smaller than a radial width of the hair-retaining device.

15. The hair-retaining device of claim 12, wherein the compliant exterior layer is comprised of one of a polymer, a fluoropolymer, a silicone, a fluorosilicone, a fluoroelastomer or a combination thereof.

16. A hair-retaining device, comprising:
   a base material, wherein the base material comprises silicone;
   a layer of epoxy resin;
   a compliant exterior layer disposed over the base material and joined to the base material by the layer of epoxy resin; and
   a top coat layer disposed over the compliant exterior layer.

17. The hair-retaining device of claim 16, wherein the base material is comprised of silicone having a range of 0.1 to 15.0 percent by weight of a total solid weight of the hair-retaining device and a thickness in a range of 10 picometers to 10 millimeters.

18. The hair-retaining device of claim 16, wherein the hair-retaining device has a substantially circular or elliptical shape with a hollow center.

19. The hair-retaining device of claim 16, wherein an axial width of the hair-retaining device is smaller than a radial width of the hair-retaining device.

20. The hair-retaining device of claim 16, wherein the compliant exterior layer is comprised of one of a polymer, a fluoropolymer, a silicone, a fluorosilicone, a fluoroelastomer or a combination thereof.

* * * * *